United States Patent [19]

Harvey

[11] Patent Number: 4,838,841
[45] Date of Patent: Jun. 13, 1989

[54] PULLEY AND HUB ASSEMBLY

[75] Inventor: William O. Harvey, Cadillac, Mich.

[73] Assignee: Kysor Industrial Corporation, Cadillac, Mich.

[21] Appl. No.: 196,284

[22] Filed: May 20, 1988

[51] Int. Cl.⁴ .............................................. F16H 55/48
[52] U.S. Cl. ..................................... 474/190; 384/571; 474/174; 474/199
[58] Field of Search ............... 474/166, 168, 174, 179, 474/198, 199, 903, 902; 384/551, 557, 571, 584, 537

[56] References Cited

U.S. PATENT DOCUMENTS

| 2,128,683 | 8/1938 | Slusser et al. | 384/571 |
| 2,938,757 | 5/1960 | Pieper | 474/174 X |
| 4,287,976 | 9/1981 | Sakaki et al. | 474/902 X |
| 4,610,645 | 9/1986 | Donn et al. | 474/199 X |

FOREIGN PATENT DOCUMENTS

| 627867 | 9/1961 | Canada | 384/551 |
| 2136092 | 9/1984 | United Kingdom | 384/551 |

Primary Examiner—Thuy M. Bui
Attorney, Agent, or Firm—Price, Heneveld, Cooper, DeWitt & Litton

[57] ABSTRACT

Disclosed is a pulley and bearing assembly for attachment to a cooling fan clutch of an internal combustion engine. The pulley is of polymeric construction, having a peripheral rim and an axial end integral therewith, the other end being open. It defines an internal chamber with guide ribs therein to locate the bearing assembly radially and axially within the chamber. The exterior has a belt engagement surface of desired type.

The bearing assembly preferably has a wave form spacer for controlled spacing of individual bearing elements, and novel lubricant dispenser structure. The polymeric pulley can be of various forms combined with the bearing assembly which acts as a universal type bearing for fitting various type engines.

18 Claims, 3 Drawing Sheets

PULLEY AND HUB ASSEMBLY

BACKGROUND OF THE INVENTION

This invention relates to a novel polymeric pulley for driving the cooling fan of an internal combustion engine, and to the combination of the polymeric pulley with a housed bearing assembly.

In recent years, fans for internal combustion engines have been considerably improved and lightened in weight, being formed of special polymeric structures weighing only a fraction of prior cooling fans. As such, rotation of the fans can be quickly initiated, stopped and regulated for optimum cooling and power usage. However, the pulley and hub drive mechanism for such fans has continued to be of heavy structure, typically of cast iron weighing well over seven pounds. This pulley and hub drive is normally, although not always, connected to a thermostatically controlled clutch for the fan. A lower mass pulley would help reduce belt wear, due to its lower moment of inertia, during speed changes. It would also permit faster engine acceleration. Reduction in mass would also add to the load carrying capacity of the vehicle.

Moreover, the typical structure is expensive to manufacture. The cast iron pulley and integral bearing housing are largely specially made for the particular model engine accommodated, involving costly casting and machining operations and requiring large inventory management. Each pulley requires a number of different machining operations and balancing. It would be advantageous to substitute this heavy construction with a lightweight assembly requiring little or no machining or balancing. Conceivably, use of polymeric materials in place of cast iron would help to secure these advantages.

Plastic or polymeric pulleys have been known heretofore. Many of these are for low duty usage, being simply solid polymeric members or, if intended for somewhat heavier duty, are composite assemblies with special metal components incorporated. Polymer and metal containing pulleys of various types are set forth in U.S. Pat. Nos. 2,760,378, 3,367,199, 3,651,705, 3,696,685, 3,772,928, 3,788,155, 4,034,616, 4,177,685, 4,326,849, 4,364,736, 4,366,609, 4,468,210, 4,473,363, 4,548,592, 4,571,226 and 4,652,474.

SUMMARY OF THE INVENTION

The novel pulley and its combination with its bearing assembly provides an effective engine cooling fan pulley arrangement capable of accommodating the intermittent high stress loads repeatedly applied in response to engine temperature variations. The novel assembly reduces the mass of prior fan drives by several pounds, being only a small fraction of the weight of previous devices. It thereby can result in longer belt life and elimination of the need for balancing. The novel device employs a polymeric pulley member clamped in compression between the steel clutch plate and a steel flange on the bearing housing, for optimum resistance to stress. The novel apparatus eliminates the requirement of a close adapter fitting which prior art pulleys needed to adapt the clutch to the pulley. The overall length of the combined pulley and bearing is also shortened, thereby providing a potential saving of space. Secondary machining operations, moreover, are not needed for the interfit between the bearing and pulley, thereby lowering production costs. Rather, the pulley has integrally formed guide means, preferably in the form of internal, radially and axially extending ribs, to locate the bearing relative to the pulley, both radially and axially. It also has integrally formed pilot surface area for alignment with the clutch.

The pulley and bearing assembly enables the same bearing to interfit with pulleys having differing outer drive peripheries, e.g. for driving by V-belts, poly belts, or toothed belts. The bearing fits within a special chamber of the pulley formed by the peripheral rim of the pulley and an axial end thereof.

The bearing elements within the bearing assembly are spaced apart by novel spacing means including a compressible-expansible wave washer allowing length variation control, and predetermined axial thrust load. It has special lubrication distribution to enable lubricant to effectively be applied to the individual bearings, and causing centrifugal force to move the grease to appropriate locations.

These and other objects, advantages, features and variations of the inventive apparatus will be apparent upon studying the following specification in conjunction with the drawings, setting forth the preferred version thereof.

BRIEF DESCRIPTION OF THE DRAWINGS

FIG. 3 is taken;

DESCRIPTION OF THE PREFERRED EMBODIMENT

Figure 1:
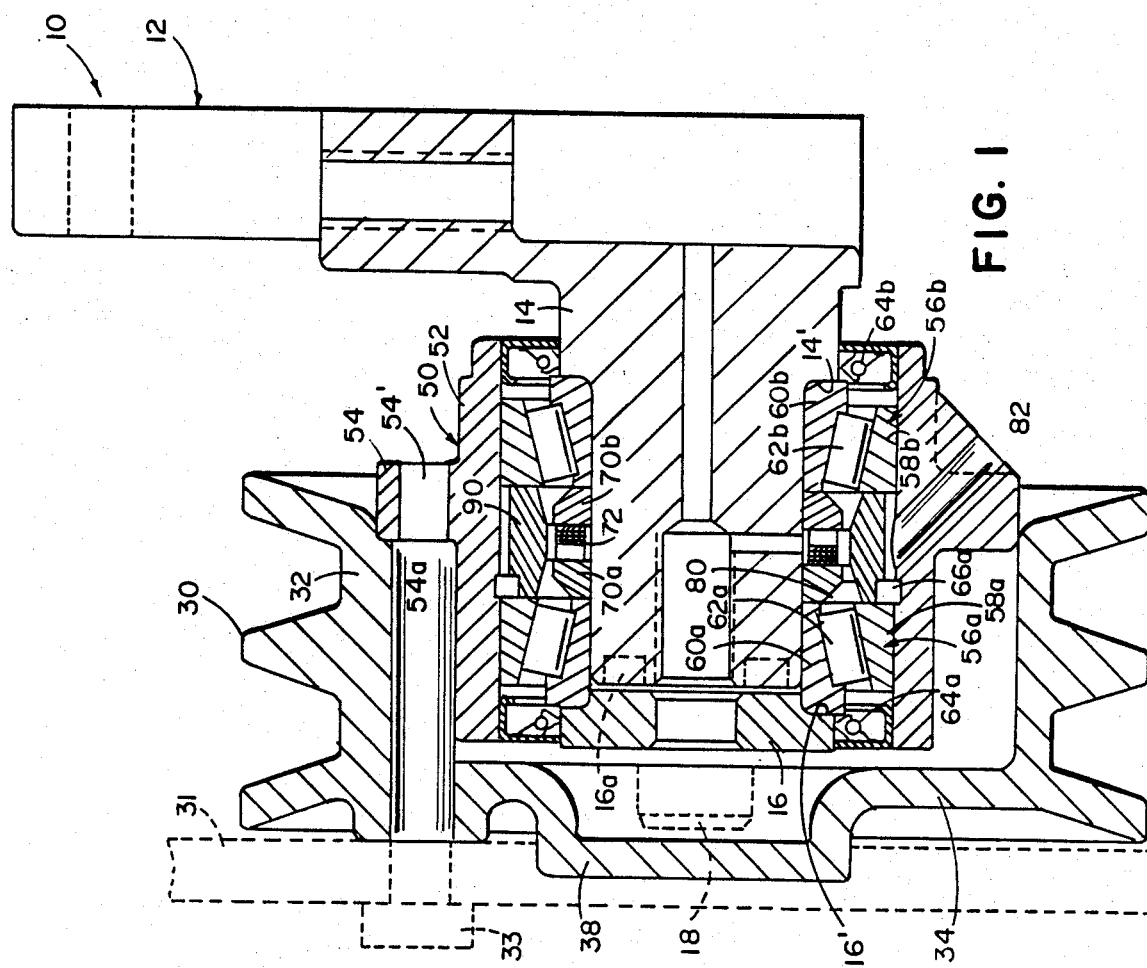
FIG. 1 is an elevational sectional view of the novel pulley in one form, in combination with its bearing and shown mounted on a shaft of a bracket.
Figure 2:
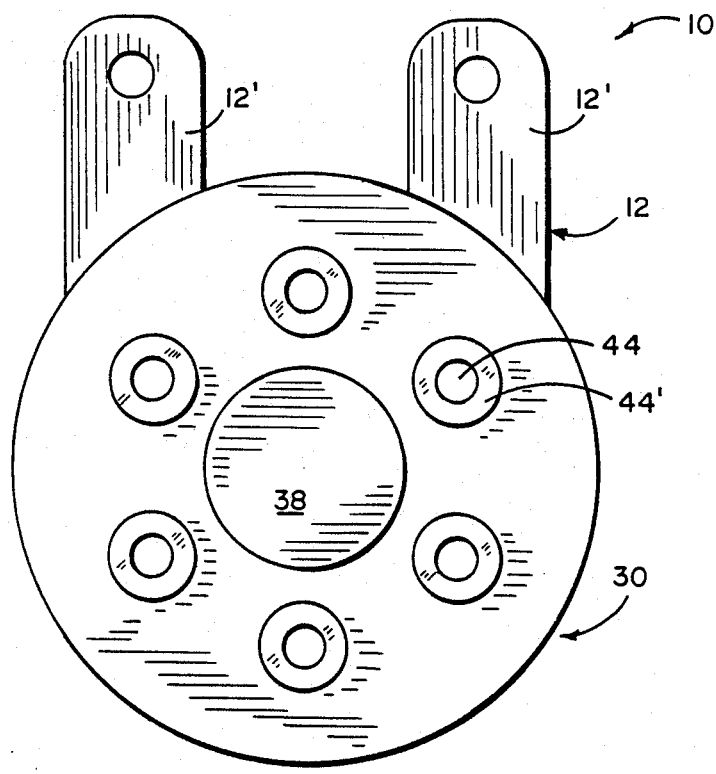
FIG. 2 is an end elevational view of the apparatus in FIG. 1, viewed from the left end of FIG. 1.

The assembly 10 (FIG. 1) is illustrated in the form of a V-belt pulley and bearing assembly for the cooling fan of an internal combustion engine. The depicted apparatus includes a conventional mounting bracket 12 having a main body with a pair of upstanding spaced ears 12' (FIG. 2) for securement to the engine and a stub shaft 14, commonly called a "base", on which the bearing and pulley assembly are mounted. The bearing is shown retained by an end plate 16 and stud 18 (shown in phantom).

Pulley 30 and bearing assembly 50 interfit with each other as described hereinafter.

Figure 3:
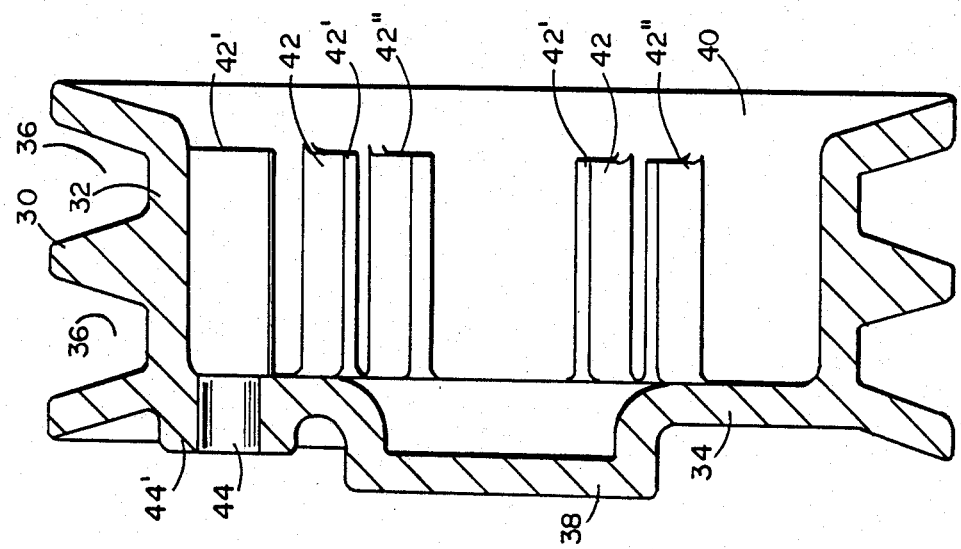
FIG. 3 is a sectional elevational view through the pulley, forming part of the apparatus of FIG. 1.
Figure 4:
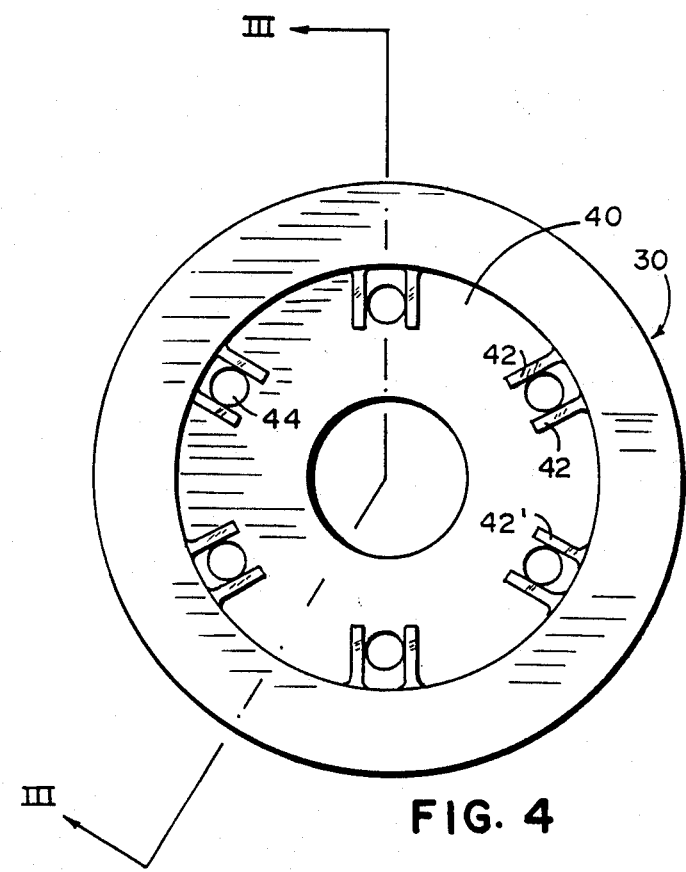
FIG. 4 is an end elevational view of the pulley in FIG. 3 viewed from the right end of FIG. 3, and having section line III—III showing where
Figure 5:
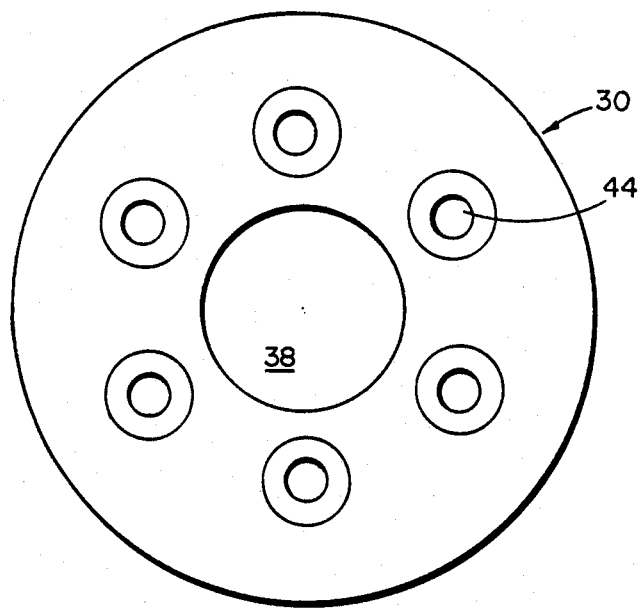
FIG. 5 is an end elevational view of the pulley in FIG. 3 taken from the left end of FIG. 3.

Pulley 30 comprises a polymeric member preferably formed by injection molding and shown to include an axially elongated peripheral rim 32 and an integral axial end 34 on one end of the rim. The opposite end of the rim is open (FIG. 3) to axially receive bearing assembly 50. The outer peripheral drive surface area of rim 32 is shown to include V-belt grooves. This could be alternate drive configurations such as poly belt grooves and toothed belt grooves. Axial end panel 34 encloses one axial end of the pulley, having an integrally-formed, outer, central protrusion 38, preferably cylindrical, forming a pilot to interfit with a correspondingly shaped opening in the center of the drive clutch plate 31 (shown in phantom) or a spacer between the pulley and the clutch. Rim 32 and axial end 34 collectively define a chamber 40 of generally cylindrical configuration. Around the periphery of this cylindrical chamber is shown a plurality of radially-inwardly protruding, axially extending ribs 42 integral with the rim. The radially inner end surfaces 42' of these ribs radially locate and center bearing assembly 50 when inserted. These ribs are formed in pairs (FIG. 4), each shown straddling an axially extending opening 44 in axial end 34. Bolt receiving orifices 44 have a peripheral boss extension 44' therearound for extra support. There are six pairs of ribs and six openings depicted in this particular embodiment, although this number can vary. The axial ends 42" of ribs 42, oriented toward the open end of chamber 40, serve as axial locator surfaces for bearing assembly 50 in a manner to be described hereinafter.

Bearing assembly 50 includes a metal housing 52, preferably of steel, of generally cylindrical configuration, and having between its ends an annular integral mounting flange 54 projecting outwardly from the periphery thereof. This mounting flange has a plurality of openings 54' therein, of equal number with and aligned with openings 44 in pulley 30. Bolt type connectors 33 (shown in phantom) extend through these openings as well as suitable openings in the clutch mounting plate 31 and into threaded engagement with threaded orifices 54' of flange 54 to cause metal plate 31 and metal mounting flange 54 to sandwich the polymeric pulley therebetween, such that the bolts place the pulley in compression. Polymeric materials have the greatest resistance to stress under compressive load.

When bearing assembly 50 is placed within hollow chamber 40 of the pulley, the axial inner face 54a (FIG. 1) of flange 54 abuts axial locator faces 42" of ribs 42, while outer cylindrical surface 52a (FIG. 1) of bearing housing 52 engages radially inner locator surfaces 42' of ribs 42 for radial location between the bearing and pulley.

The bearing assembly is shown to include two bearings therein, spaced from each other by appropriate spacer means. More specifically, bearings 56a and 56b include outer races 58a and 58b inner races 60a and 60b, and a plurality of round, here cylindrical, roller bearing members 62a and 62b respectively. At the axial outer ends of bearing housing 52 is a pair of bearing seals 64a and 64b. Between the two bearings and adjacent the respective bearings is a retaining snap ring 66a to prevent axial inward movement of bearing 56a or axial inward movement of bearing 56b by force on spacer 90. Engaging the axial outer ends of the inner races is locating shoulder 16' on retainer plate 16, and shoulder 14' on shaft 14.

Retainer plate 16 contains two tangs 16a, approximately 80 degrees apart, which engage like slots in the end of the shaft for antirotation of plate 16.

Also positioned between the two bearings is spacer means in the form of a pair of polymeric spacer rings 70a and 70b engaging the inner races around the periphery of shaft 14 as well as sandwiching therebetween a wave type washer 72 which is resiliently compressible-expansible under axial force. This axial force can thus be preset to minimize rotation of the inner cones on the shaft during operation.

The spacer arrangement allows the axial spacing of the bearings to be exactly achieved as well as the desired axial force load to be effected. Specifically, by controlled tightening of socket head, self locking bolt 18 against cap 16 to axially shift bearing 56a toward bearing 56b, wave spring 72 is compressed until the desired bearing end play (e.g. about 0.002 inch) position is achieved and preferably a force load of about 100 pounds obtained.

Extending radially through housing 52 and into the annular space 80 between the bearings is a lubricant inlet passage 82 for lubrication of the bearing elements. Spacer rings 70a and 70b are tapered diagonally away from space 80 toward the individual bearings so that lubricant injected at 82 will flow freely to the roller elements of the rear bearing 60b first, then forward to front bearing 60a. This is initially injected before installing retainer plate 16. Moreover, rotation of the assembly will cause centrifugal force to drive the lubricant back toward the roller elements during operation because of the tapered corners of annular spacer 90 (FIG. 1) between the bearings.

Figure 6:
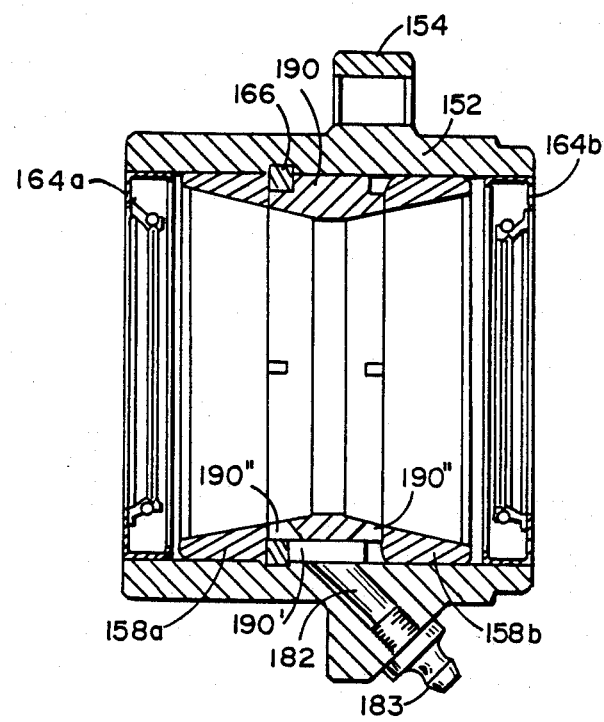
FIG. 6 is a sectional elevational view of a second embodiment of bearing assembly for combination with a pulley of this invention.

In FIG. 6 is depicted a modified form of bearing which can be used with the novel assembly and pulley. In this instance, the bearing housing 152 has, as before, an annular outer mounting flange 154 and a generally cylindrical interior. However, the spacer means between the two bearing elements, here represented only by the outer races 158a and 158b, comprises a single polymeric ring 190 between and in engagement with the outer races. In this embodiment, lubricant inlet passage 182, shown to have a zerk fitting 183, communicates with a cutout 190' in spacer 190, such cutout forming a cavity communicating with diagonally outwardly oriented passages 190" oriented toward the bearings for optimum flow of lubricant thereto. A snap ring 166 retains the components in position. A pair of end seals 164a and 164b retain the lubricant.

It is conceivable that additional variations other than those specifically enumerated may be made to the apparatus, the preferred embodiment only of which is depicted and described in detail herein, without departing from the invention. Hence, it is intended that the invention is not to be limited to this disclosed embodiment, but only by the scope of the appended claims and the reasonable equivalents thereto.

The embodiments of the invention in which an exclusive property or privilege is claimed are defined as follows:

1. A pulley for interfit with a bearing assembly comprising:

a polymeric pulley member having an annular rim with drive groove means in the outer periphery thereof for receiving a drive belt, and having an axial end integral with said rim;

said pulley axial end having an exterior face;

said polymeric pulley defining an internal chamber with said pulley axial end at one end of said chamber, and being open on the opposite axial end of said chamber;

said pulley axial end having axially oriented, connector receiving openings therethrough between said chamber and said exterior face, whereby said pulley axial end being placed in compression between a bearing in said chamber and a member at said exterior face by connectors;

said chamber including bearing guide means for engaging a bearing assembly inserted into said chamber.

2. The pulley of claim 1 wherein said bearing guide means comprises circumferentially spaced, axially oriented ribs.

3. The pulley of claim 1 wherein said bearing guide means include radially inwardly oriented guide surface area to radially locate an inserted bearing assembly and axially oriented surface area to axially locate the inserted bearing assembly.

4. The pulley of claim 3 wherein said bearing guide means comprises circumferentially spaced, axially oriented ribs, said ribs having said axially oriented surface areas on the ends thereof, and said ribs also serving to reinforce said rim.

5. The pulley of claim 1 wherein said openings are adjacent said rim.

6. The pulley of claim 1 wherein said pulley axial end has a clutch pilot means at said exterior face for piloting engagement of said pulley with a clutch or spacer.

7. A pulley and bearing assembly comprising:
a polymeric pulley member having an annular rim with drive groove means in the outer periphery thereof for receiving a drive belt, and having an axial end integral with said rim;
said pulley axial end having an exterior face;
said polymeric pulley defining an internal chamber with said pulley axial end at one end of said chamber, and being open on the opposite axial end of said chamber;
said pulley axial end having axially oriented, connector receiving openings therethrough between said chamber and said exterior face, whereby said pulley axial end being placed in compression between a bearing in said chamber and a member at said exterior face by connectors;
said chamber including bearing guide means for engaging a bearing assembly inserted into said chamber;
a bearing assembly in said chamber;
said bearing assembly having peripheral surface area in engagement with said bearing guide, means, and having axially oriented connector receiving orifices aligned with said connector receiving openings in said pulley.

8. The pulley and bearing assembly of claim 7 wherein said bearing assembly includes a peripheral flange engaging said bearing guide means, and said orifices being through said flange.

9. The pulley and bearing assembly of claim 7 wherein said bearing assembly includes a housing and a pair of spaced bearings in said housing, each having an inner race, an outer race, and bearing elements;
spacer means between said spaced bearings for controlling the space therebetween, said spacer means including a compressible-expansible wave washer; and
means for shifting said bearings axially with respect to each other against the force of said wave washer.

10. The pulley and bearing assembly of claim 7 wherein said bearing assembly includes a housing and a pair of spaced bearings in said housing, each having an inner race, an outer race, and bearing elements;
spacer means between said spaced bearings for controlling the space therebetween; and
a lubricant inlet through said bearing housing at said spacer means, and passages to each of said bearings from said inlet.

11. The pulley and bearing assembly of claim 7 wherein said passages are diagonally oriented relative to said inlet to direct lubricant toward said bearings.

12. The pulley and bearing assembly of claim 7 wherein said bearing guide means comprises circumferentially spaced, axially oriented ribs.

13. The pulley and bearing assembly of claim 7 wherein said bearing guide means include radially inwardly oriented guide surface area to radially locate an inserted bearing assembly and axially oriented surface area to axially locate the inserted bearing assembly.

14. The pulley and bearing assembly of claim 13 wherein said bearing guide means comprises circumferentially spaced, axially oriented ribs, said ribs having said axially oriented surface areas on the ends thereof, and said ribs also serving to reinforce said rim.

15. The pulley and bearing assembly of claim 14 wherein said bearing assembly includes a peripheral flange engaging said bearing guide means, and said orifices being through said flange to enable said pulley to be clamped in compression between said flange and a clutch.

16. The pulley and bearing assembly of claim 7 wherein said pulley axial end has a clutch pilot means at said exterior face for piloting engagement of said pulley with a clutch or spacer.

17. The pulley and bearing assembly of claim 7 wherein said openings are adjacent said rim.

18. A pulley and bearing assembly comprising:
a polymeric pulley member having an annular rim with drive groove means in the outer periphery thereof of receiving a drive belt, and having an axial end integral with said rim;
said pulley axial end having an exterior face;
said polymeric pulley defining an internal chamber with said pulley axial end at one of said chamber, and being open on the opposite axial end of said chamber;
said pulley axial end having axially oriented, connector receiving openings therethrough between said chamber and said exterior face, whereby said pulley axial end being placed in compression between a bearing housing in said chamber and a member at said exterior face by connectors;
said chamber including bearing guide means for engaging a bearing assembly inserted into said chamber;
a bearing assembly in said chamber;
said bearing assembly having peripheral surface area in engagement with said bearing guide means, and having axially oriented connector receiving orifices aligned with said connector receiving openings in said pulley;
said bearing assembly includes a peripheral flange engaging said bearing guide means, and said orifices being through said flange to enable said pulley to be clamped in compression between said flange and as clutch;
said bearing assembly includes a peripheral flange engaging said bearing guide means, and said orifices being through said flange;
said bearing assembly includes a housing and a pair of spaced bearings in said housing, each having an inner race, an outer race, and bearing elements;
spacer means between said spaced bearings for controlling the space therebetween, said spacer means including a compressible-expansible wave washer; and means for shifting said bearings axially with respect to each other against the force of said wave washer;

said bearing guide means comprises circumferentially spaced, axially oriented ribs;

said ribs having said axially oriented surface areas on the ends thereof, and said ribs also serving to reinforce said rim.

* * * * *

UNITED STATES PATENT AND TRADEMARK OFFICE
CERTIFICATE OF CORRECTION

PATENT NO. : 4,838,841
DATED : June 13, 1989
INVENTOR(S) : William O. Harvey

It is certified that error appears in the above-identified patent and that said Letters Patent is hereby corrected as shown below:

Column 2, line 37;
    "line" should be -- lines --;

Column 6, Claim 18, Line 32;
    "of" should be -- for --;

Column 6, Claim 18, Line 36;
    After "one" insert -- end --;

Column 6, Claim 18, Line 58;
    "as" should be -- a --.

Signed and Sealed this

Fourteenth Day of August, 1990

Attest:

HARRY F. MANBECK, JR.

*Attesting Officer*          *Commissioner of Patents and Trademarks*